Aug. 12, 1952      W. B. KIRKPATRICK      2,606,427
METHOD AND APPARATUS FOR MAKING ICE
Filed April 10, 1950      4 Sheets-Sheet 1
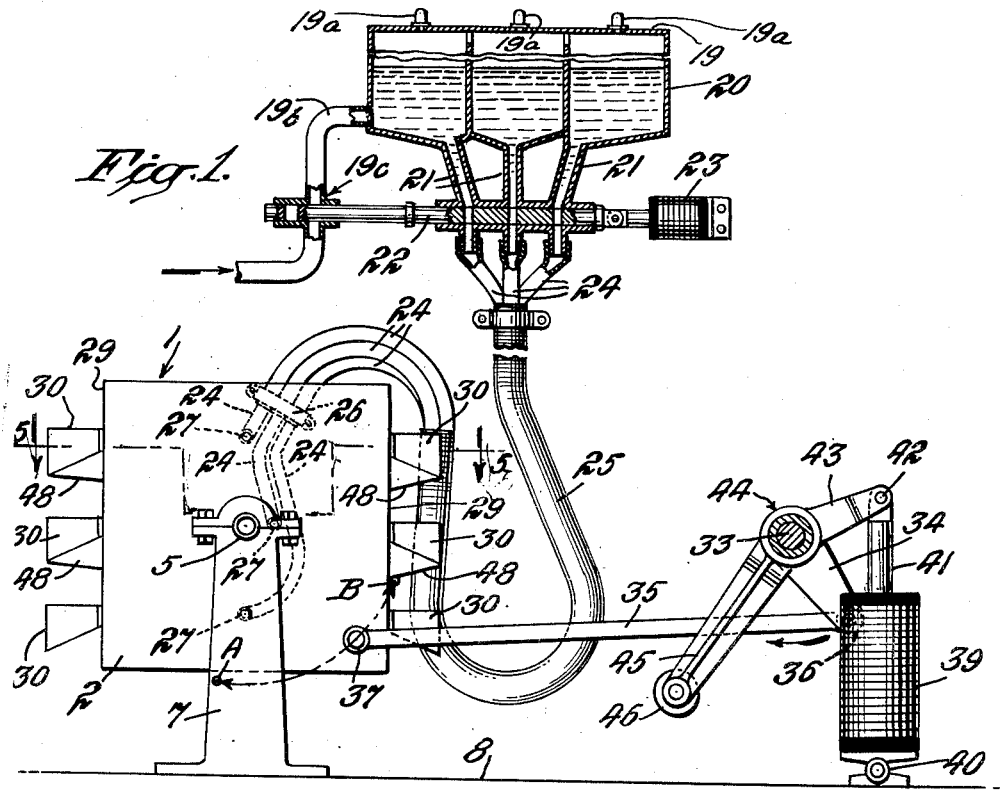
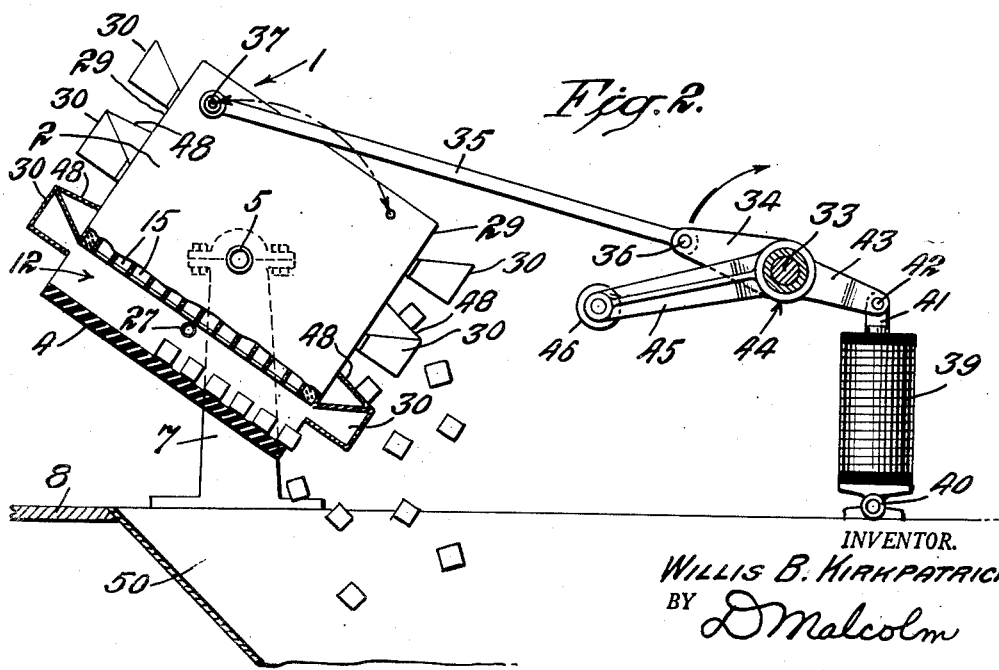
INVENTOR.
WILLIS B. KIRKPATRICK
BY D. Malcolm
ATTORNEY

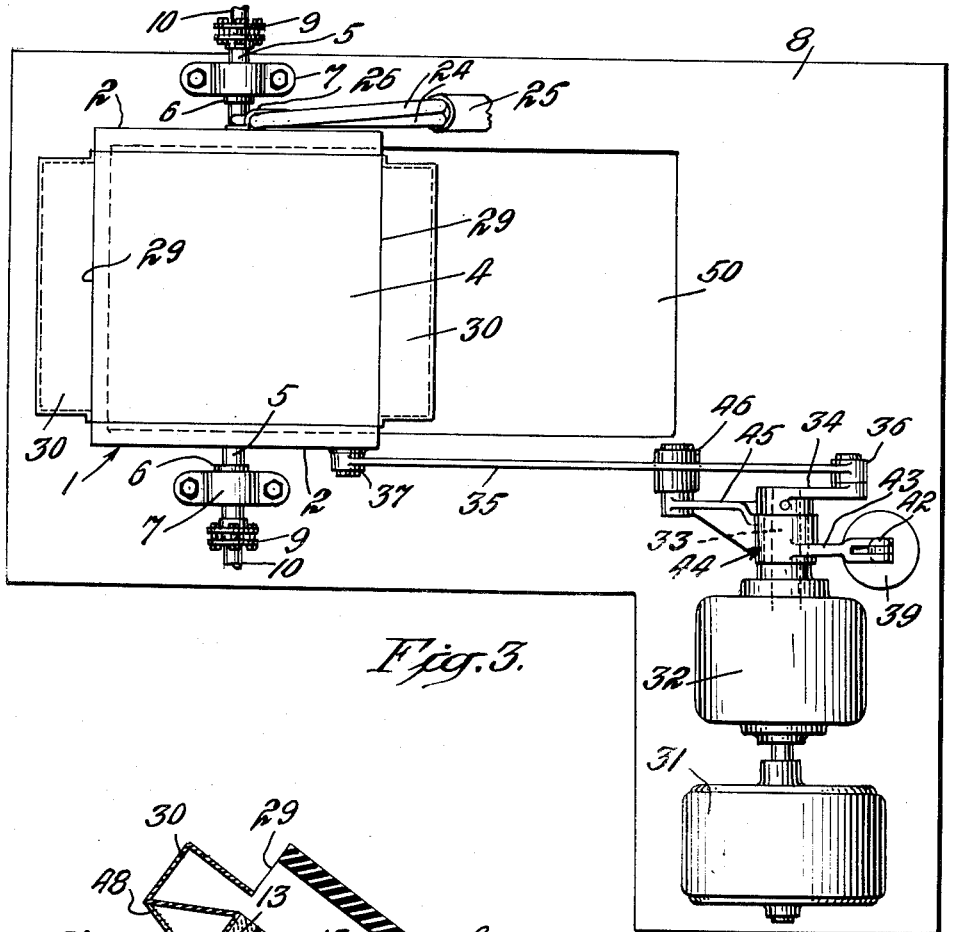
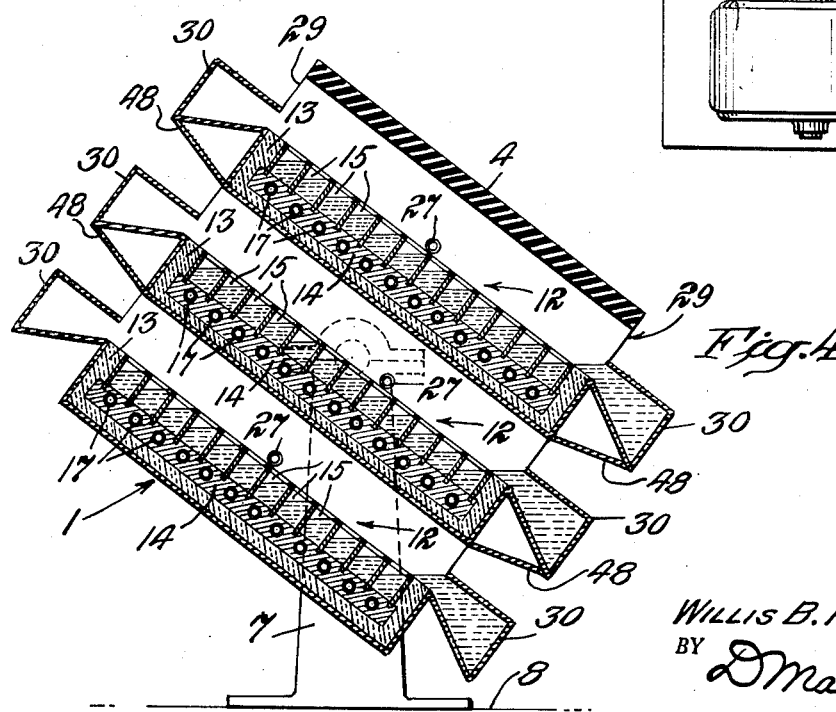

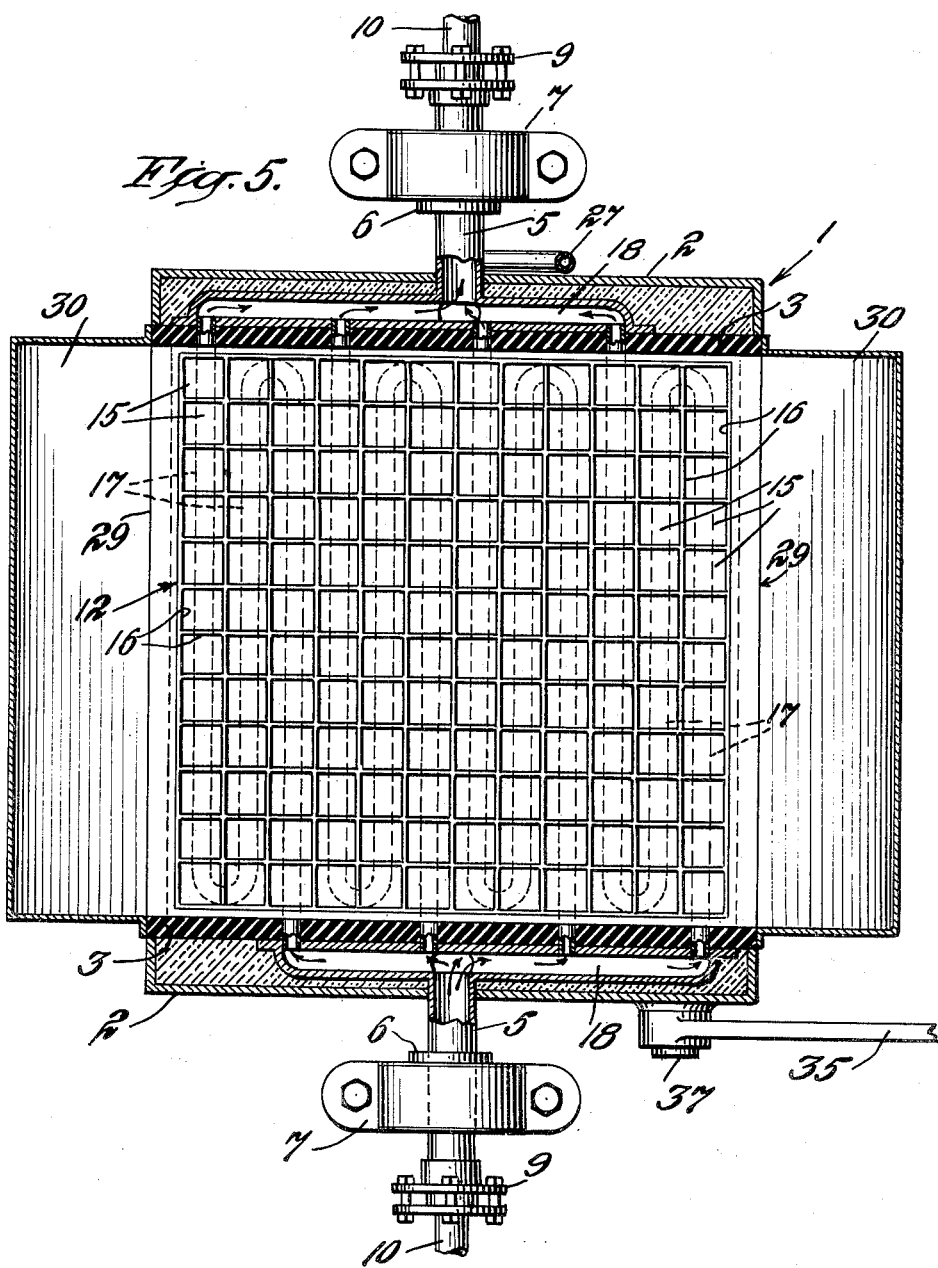

Aug. 12, 1952 W. B. KIRKPATRICK 2,606,427
METHOD AND APPARATUS FOR MAKING ICE
Filed April 10, 1950 4 Sheets-Sheet 4
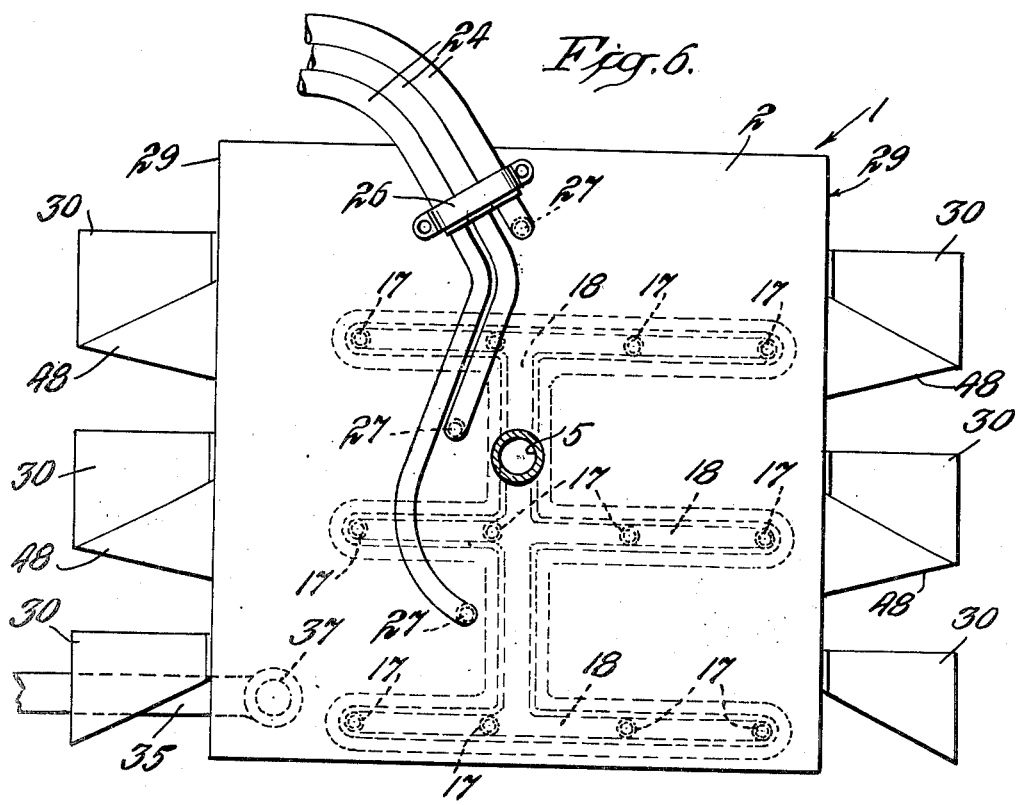
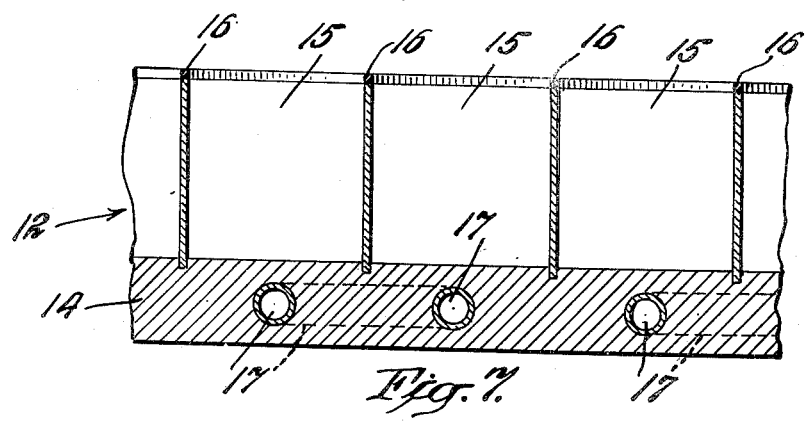
INVENTOR.
WILLIS B. KIRKPATRICK
BY D. Malcolm
ATTORNEY Patented Aug. 12, 1952

2,606,427

UNITED STATES PATENT OFFICE 2,606,427

METHOD AND APPARATUS FOR MAKING ICE

Willis B. Kirkpatrick, Scarsdale, N. Y.

Application April 10, 1950, Serial No. 155,028

12 Claims. (Cl. 62—106)

This invention relates to the manufacture of ice and it has for its object to provide a novel and improved method and apparatus for making ice blocks economically, automatically, and in large volume.

Another object of the invention is to provide a simple and efficient method and apparatus for freezing raw water, as distinguished from distilled or treated water, into crystal-clear blocks of ice.

Another object is to form clear ice blocks of uniform size with flat tops in individual compartments by continuously tilting or rocking the compartment assembly and thus causing the liquid to flow to and fro across the compartments during the freezing operation without excessive turbulency or wearing of the surface of the ice as it is formed.

Still another object is to provide an ice making machine of the type specified having novel and improved details of construction and features of operation.

Various other objects and advantages will be apparent as the nature of the invention is more fully disclosed.

If raw water is frozen in a quiescent state the resulting ice will be white or opaque in appearance and of no commercial value except for the refrigeration of railroad cars, meat boxes, milk boxes or other large spaces where such refrigeration is adequate.

In order to produce merchantable clear ice the raw water is kept in a state of agitation during the entire freezing process so as to keep air bubbles or globules from forming on the surface of the ice as the water is congealed, and to cause suspension of the salts in the water and to throw them off during the freezing period.

In plants where ice is manufactured on a large scale for retail and wholesale distribution, compressed air is used to maintain the agitation of the water in the compartments or cells where the blocks of ice are formed. By dehydrating the air the agitation of the water is maintained throughout the entire freezing operation.

In recent years there has been an ever increasing demand for small blocks or cakes of ice. Ice plants have produced these small blocks of ice from 300 pound cakes of ice by means of a series of circular saws operated so as to cut lengthwise and crosswise of the cake. This entails a considerable loss in ice due to the saw cuts, and, of course, involves a considerable labor cost.

In order to do away with this loss considerable effort has been expended in the past few years to freeze clear ice into small blocks, and to develop machines that will produce such blocks automatically. As it has not been thought practical to agitate water in many small refrigerated compartments by the use of compressed air, other means have been employed, with varying degrees of success, to keep the water in a state of agitation during the freezing period.

Many of these agitating devices defeat the very purpose for which they were intended. The agitation of the water being produced by sprays, moving disks and circulated water, by all of which mechanical means excess pressure of the liquid is exerted on the surface of the ice as the water is being congealed, a period in the freezing time arrives when the wearing effect of the water on the surface of the ice prevents any further growth in its thickness, or so slight a growth as to make further freezing impractical. In all of these devices, therefore, it is not possible or practical to completely freeze all of the water in the compartments, and the blocks therefore have holes or cavities through the center of varying sizes dependent on the amount of pressure that has been exerted by the agitating medium or device.

According to my invention I do not agitate the water but get the desired effect, in the preferred embodiment of the invention, by oscillating the refrigerated compartments through a limited arc of less than ninety degrees on each side of the horizontal center line of the compartments, and, by so doing, the water in the compartments is gently wiped against the compartment walls or the surface of the previously formed ice, as the case may be, without any wearing effect on the ice surface but with the desired result of displacing all air bubbles from the surface of the ice and overcoming as well any tendency to create a whitish cast in the ice due to the entrained gases and salt content of the water.

Furthermore, due to the fact that the compartments do not entirely empty during their oscillation, since each one holds a considerable amount of its supply of water during each freezing cycle, there is a continuous transfer of heat and no interruption of the freezing process. The degree of oscillation may be varied to cascade larger proportions of water through the compartments than is eventually frozen therein, thereby suiting the amount of agitation or the extent of the wiping effect to the analysis of the make-up water and insuring the greatest clarity of the resulting blocks of ice. Furthermore, program cycling may be so arranged to take place before all of the water released to the trays is frozen with consequent exhausting from the system that portion of the water bearing concentration of accumulated impurities, which again assures the utmost in ice clarity.

An important advantage of my invention resides in its ability to economically manufacture blocks of ice in any desired size. Almost universally commercial ice is manufactured in three-hundred pound blocks. However, a very large percentage of all the blocks of ice manufactured are cut by the use of "scoring" machines into one hundred, fifty and twenty-five pound pieces. The smallest piece of ice fits into the smallest conventional domestic ice box. Multiples of the smaller block will readily fit into all sizes of domestic ice boxes. Furthermore, when ice is delivered in blocks it is accounted for in pieces and not weight, and the question of shortage of ice or shrinkage from breakage is eliminated.

My invention is particularly useful for producing ice in any desired size block which saves the loss of ice sustained from cutting a 300 pound cake into pieces, as well as the labor employed in this operation. Also blocks produced by my machine are crystal clear throughout with keen edges whereas when cut from a 300 pound cake of ice each piece may have ragged edges and a portion of "core" ice in it which is the last of the water to be congealed in the 300 pound cake and contains salts and any impurities in the water which due to their lower freezing point must be thrown off in the process of freezing and are finally trapped in the center of the ice. This is objectionable to the customer as it is very likely to cause a milky film on the surface of the ice as it melts and this portion of the ice contains any impurities which were present in the water. In my process and apparatus the water, not being confined in a quiescent state in the compartments where it is frozen, does not produce a core in the ice as all the salts and impurities are thrown off in the freezing process.

Although the novel features which are characteristic of my invention are set forth more in detail in the claims appended hereto, the nature and scope of the invention may be better understood by referring to the following description taken in connection with the accompanying drawings forming a part thereof, in which a specific embodiment has been set forth for purposes of illustration.

In the drawings:

Fig. 1 is a side view, partly in section, of an ice making machine embodying the invention, in position for the filling and freezing operations;

Fig. 2 is a similar view with the filling device omitted and with the rotatably mounted carrier in inverted position discharging the blocks of ice;

Fig. 3 is a top plan view of the machine with the overhead water supply reservoir omitted;

Fig. 4 is a transverse vertical section through the rotatably mounted carrier, showing same in tilted position as it rocks to and fro during the freezing period;

Fig. 5 is a top plan view taken on line 5—5 of Fig. 1, showing one of the ice trays of the rotatably mounted carrier;

Fig. 6 is an end view of the carrier, showing the water supply pipes and the means for refrigerating the various ice trays; and Fig. 7 is an enlarged broken longitudinal section through one of the ice trays, showing the refrigerating coils and the bonded rubber rims on the open ends of the compartments to prevent ice from adhering thereto.

In the following description certain specific terms are used for convenience in referring to the various details of the invention. These terms, however, are to be interpreted as broadly as the state of the art will permit.

The apparatus illustrated herein by way of example comprises a rotatably mounted carrier 1 having a pair of rectangular insulated side walls 2. The walls 2 have inner plates 3 preferably composed of plastic insulating material, and a top plate 4 secured to said plates 3 may be composed of similar insulating material. The side walls 2 have central hollow stub shafts 5 which are rotatably mounted in bearings 6 on standards 7 which are secured to the platform 8, as shown in Figs. 1 to 4. Suitable couplings 9 provide a seal between the revoluble shafts 5 and the pipes 10 through which a refrigerant is circulated as hereinafter described.

The rotatably mounted carrier 1 has a plurality of spaced parallel ice trays 12 mounted one above the other between the inner side plates 3 of the carrier. In the embodiment illustrated these trays are three in number. The trays 12 are all alike, and, in the embodiment shown herein, Figs. 4 and 7, each tray has a lining 13 of insulating material and a cast aluminum base 14 supporting a plurality of open-ended ice compartments 15. The open ends or tops of the compartments 15 of each individual tray 12 are disposed in a common plane, and a narrow strip of rubber 16 is bonded to the outer edges of the compartments 15, as shown in Fig. 7, to prevent ice from adhering thereto and spanning the spaces between the individual compartments. The spaces between the several parallel ice trays 12 (and the space between the topmost tray 12 and the top plate 4) are ample to permit the blocks of ice to tumble out of the compartments and be discharged when the carrier 1 is inverted at the conclusion of the freezing period, as hereinafter more fully described.

The refrigerant circulating system includes hollow copper coils 17 which are embedded in the cast aluminum bases 14 of the ice trays 12, as shown in Fig. 7. The convolutions of the coils 17 are aligned with each file of compartments 15, and for uniform freezing and thawing I prefer to employ a plurality of relatively short coils instead of a single long coil in each tray. The ends of the respective coils 17 are connected to branch conduits 18 in the insulated side walls 2 of carrier 1, and these conduits 18 communicate with the hollow stub shafts 5 as shown in Figs. 5 and 6. The fluid refrigerant enters one of the stub shafts 5, passes through the adjacent branch conduits 18 in side wall 2 into the coils 17 of all the ice trays 12, and then passes out through the opposite conduits 18 and stub shaft 5.

The liquid to be frozen, which will usually be raw water, may be supplied to the several trays 12 by the means illustrated in Figs. 1, 4 and 6. The reservoir 20 of Fig. 1 comprises three individual water tanks (one for each ice tray 12) having individual outlets 21 controlled by a common valve stem 22 which is actuated by solenoid 23. The three tank sections of reservoir 20 are completely closed by a top wall 19 containing three air vents 19a containing ball members or the like which close to prevent the overflow of water when the reservoir is full, and open to admit air when water is to be discharged as hereinafter described. The two side walls which separate the tank sections from one another have openings at the top to permit incoming water to overflow from one tank to the next and thereby supply an equal amount of water to each tank. Water is supplied to the reservoir by a pipe 19b connected to the top of the left-hand tank in Fig. 1, the supply of water being controlled by a valve 19c actuated by valve stem 22. The reservoir tank outlets 21 communicate through separate valve ports with individual flexible hoses 24 which may be conveniently sheathed in a flexible cable 25 and secured to one side wall 2 of carrier 1 by a clamp 26, and these hoses 24 are connected to stub inlet pipes or nipples 27 which extend through the side wall 2 and open into the respective ice trays 12 as shown in Fig. 4.

When the parts are in the position shown in Fig. 1 the valve ports in reservoir outlets 21 are open and water is flowing through the flexible hoses 24 to charge the several ice trays 12. At such time the valve 19c shuts off the supply of water through pipe 19b to reservoir 20. The head of water in the reservoir is just sufficient to fill the ice compartments 15 of the several trays 12 when the valve 22 is open during the charging period. During said charging period (as well as during the entire freezing period) the carrier 1 rocks to and fro as indicated in Fig. 4 and as hereinafter more fully described, and the water entering the trays 12 through inlet pipes 27 is distributed to all of the compartments 15 of said trays. At the conclusion of the charging period a suitable timing device (not shown) actuates solenoid 23 to close the valve ports in reservoir outlets 21 and simultaneously open the valve 19c thereby permitting water to flow through pipe 19b to refill the reservoir 20. The valve 19c remains open throughout the freezing period, although, when the tank sections of reservoir 20 are filled, the closing of vents 19a prevents any more water from flowing into the reservoir.

At opposite open ends 29 of carrier 1 (through which the ice blocks are discharged at the conclusion of the freezing period) barriers or troughs 30 are provided to catch the water which is tilted or cascaded to and fro in the trays 12 by the rocking movement of the carrier. Fig. 4 shows the carrier 1 tilted at an angle of about 40 degrees from the horizontal, in which position the liquid overflowing from the compartments 15 is caught in the troughs 30 at the right-hand end of the carrier as viewed in Fig. 4. When the carrier next tilts toward the left in Fig. 4 the water will cascade out of the right-hand troughs 30 and flow into the various compartments 15, wiping gently over the refrigerated walls of said compartments (or over any layers of ice already formed on said walls) until the excess of yet unfrozen water spills into the troughs 30 at the left-hand end of the carrier in Fig. 4. This action continues until the ice blocks are completely formed, as hereinafter more fully described.

The amount of water employed is just sufficient to fill each of the trays to the desired level. The volume of water for each tray is preferably substantially greater than that which is to be frozen. The volume of the excess depends on several factors including its hardness or salt content and the amount of solids and impurities present; also the number and spacing of the compartments within the tray, their depth and the number of rows of compartments (over the forward edges of which the water is cascaded and through which it gently flows) as well as the angle and frequency of oscillation of the trays in which the compartments are mounted.

The driving mechanism for rocking the carrier 1 comprises a motor 31 mounted on platform 8 and operating through a suitable gear reduction device 32 to rotate shaft 33 upon which is keyed an arm 34. A reciprocable rod 35 has one end pivoted at 36 to arm 34 and the other end pivoted at 37 to one side wall 2 of the carrier adjacent the lower right corner thereof as viewed in Fig. 1. The shaft 33 and arm 34 always rotate in a clockwise direction as viewed in Fig. 1, and in the normal position of the parts shown in Fig. 1 (during the freezing period) the stroke of the reciprocable rod 35 is such as to oscillate the carrier 1 through a limited arc which, in the embodiment illustrated herein, is preferably an arc of about 40 degrees on each side of the horizontal center line of the compartments 15 as indicated by the arcuate arrows in Fig. 1. The maximum forward stroke of rod 35 (toward the left in Fig. 1) is attained when the pivot 37 reaches the point "A" in Fig. 1, at which time the carrier 1 is in the maximum tilted position shown in Fig. 4; and the maximum backward stroke of rod 35 (toward the right in Fig. 1) is attained when the pivot 37 reaches the point "B" in Fig. 1.

In order to invert the carrier 1 for the purpose of discharging the ice at the conclusion of the freezing period, I provide a solenoid 39 which is pivotally mounted at 40 on the platform 8 and has an armature 41 pivoted at 42 to one arm 43 of a bell crank lever 44 which is journalled on the rotatable shaft 33 as shown in Figs. 1 to 3. The other arm 45 of bell crank lever 44 carries a roller 46 of rubber or other suitable cushioning material which lies directly beneath the reciprocable rod 35 as shown in Fig. 1. At the conclusion of the freezing period the solenoid 39 is energized by any suitable timing device (not shown) and attracts its armature 41, thus rotating the bell crank lever 44 in a clockwise direction as viewed in Fig. 1. The roller 46 on crank arm 45 thereupon engages and elevates the reciprocable rod 35, and, in so doing, rotates the carrier 1 to the inverted position shown in Fig. 2. The driving shaft 33 may continue to rotate in a clockwise direction as viewed in Fig. 2 and the reciprocating rod 35 rocks the inverted carrier 1 through a limited arc as indicated by the arcuate arrows in Fig. 2. Now, each time the reciprocating rod 35 reaches the lowermost point in its stroke said rod will touch and slide over the roller 46 which prevents the carrier 1 from returning by gravity to the upright position shown in Fig. 1. Oscillation may be continued or stopped during the thawing portion of the cycle.

A suitable automatic timing means (not shown) now raises the temperature of the fluid refrigerant circulating through coils 17 in the several ice trays 12 sufficiently to thaw the ice in the compartments 15, permitting the ice blocks to be discharged downwardly by gravity through the open end 29 of the continuously rocking carrier 1. The ice blocks discharged from the now-lowermost ice tray 12 slide over the now-inverted top plate 4 of the carrier, while the blocks released from the other trays 12 glide over sloping ledges 48 on the adjacent troughs 30 as shown in Fig. 2, the ice blocks tumbling into a discharge chute 50 in the platform 8.

At the conclusion of the thawing and discharging period the automatic timing device (not shown) deenergizes the solenoid 39 which returns its armature 41 and bell crank lever 44 to the position shown in Fig. 1. Thereupon crank arm 45 will swing downwardly and carry the roller 46 out of the path of movement of the continuously reciprocating rod 35; and, when said rod 35 next reaches the lowermost point in its stroke, the carrier 1 will flip over by gravity (as it is no longer restrained by the now descended roller 46) and return to the "upright" position shown in Fig. 1. The reciprocating rod 35 continues to rock the now "upright" carrier 1 through the arc "A—B" in Fig. 1. The timing device again lowers the temperature of the fluid refrigerant circulating through coils 17 to the proper "freezing" point, and also actuates solenoid 23 and valve stem 22 to open the reservoir outlets 21 and discharge water from reservoir 20 through hoses 24 and inlet pipes 27 into the several ice trays 12. Valve stem 22 likewise closes valve 19c to shut off the supply of water through pipe 19b to reservoir 20, as previously described. When the predetermined measured quantity of water has been discharged, sufficient to fill the various compartments 15, the solenoid 23 is actuated to close the valve 22 and shut off the flow of water, and, of course, open the valve 19c to recharge the reservoir.

The carrier 1 rocks back and forth continuously as long as the machine is in operation, and the water in the compartments 15 is gently wiped against the compartment walls, or against the surface of the ice which is gradually built up on said walls, without any wearing effect on the surface of the ice. As a result, the gentle swishing motion of the water displaces air bubbles and occluded solid matter from the surface of the ice as it is congealed, thereby producing clear ice and preventing the formation of a cloudy "core" in the blocks.

While a specific example has been shown and described herein for purposes of illustration, it will be evident to those skilled in the art that the invention is capable of various modifications and adaptations within the scope of the appended claims.

The invention claimed is:

1. Method of making clear cakes of ice from raw water, which comprises freezing a portion of said water in a plurality of open-topped ice compartments, gently and continuously tilting said compartments to and fro as a unit throughout the freezing operation to wipe the water, gently and without turbulency, first against the compartments themselves and subsequently against the surfaces of the ice formed in said compartments, continuously flowing the water from compartment to compartment and out of a compartment at one end of the unit each time the unit is tilted in one direction, trapping the water flowing out of such end compartment, and returning such trapped water to said end compartment and flowing water from compartment to compartment and out of a compartment at the other end of the unit as the unit is tilted in the other direction, and trapping the water flowing out of said second end compartment and returning it to such second end compartment as the unit is tilted back in the first direction.

2. Method of making clear cakes of ice from raw water in a tray unit having a plurality of ice compartments, which comprises initially filling said tray unit with enough water to at least substantially fill all said compartments, freezing a portion of said water in said ice compartments, gently and continuously tilting said compartments to and fro as a unit throughout the freezing operation to wipe the water, gently and without turbulency, first against the compartments themselves and subsequently against the surfaces of the ice formed in said compartments, continuously flowing the water from compartment to compartment and out of a compartment at one end of the unit each time the unit is tilted in one direction, trapping the water flowing out of such end compartment, and returning such trapped water to said end compartment and flowing water from compartment to compartment and out of a compartment at the other end of the unit as the unit is tilted in the other direction, and trapping the water flowing out of said second end compartment and returning it to such second end compartment as the unit is tilted back in the first direction.

3. In a method as claimed in claim 2, stopping the freezing when a small amount of the water remains unfrozen, and pouring off such unfrozen water.

4. The method of producing clear blocks of ice comprising placing water in excess of the amount to be frozen in a shallow receptacle having a plurality of transverse separators dividing said receptacle into compartments, oscillating the receptacle about an axis parallel to said separators to cause the water to flow back and forth longitudinally of said receptacle over said separators, catching the excess water overflowing from the end compartment during each oscillation and returning it to such end compartment, subjecting the water to refrigeration during oscillation to produce freezing, stopping the refrigeration when a part of the water remains unfrozen, and pouring off such unfrozen water with the impurities contained therein after the formation of blocks of ice between the separators.

5. Method of making clear cakes of ice from raw water, which comprises freezing a portion of said water in an open-topped ice receptacle, gently and continuously tilting said receptacle to and fro throughout the freezing operation to wipe the water, gently and without turbulency, first against the walls of the receptacle and subsequently against the surfaces of the ice formed in said receptacle, continuously flowing the water along the receptacle and out of one end of the receptacle each time the receptacle is tilted in one direction, trapping the water flowing out of such end of the receptacle, and returning such trapped water to said end and flowing water along the receptacle and out of the other end of the receptacle as the receptacle is tilted in the other direction, and trapping the water flowing out of said second end of the receptacle and returning it to such second end as the receptacle is tilted back in the first direction.

6. An ice making machine comprising a rotatably mounted open-topped container for the liquid to be frozen, means for refrigerating said container, means for supplying liquid to said container, troughs on the ends of said container to catch excess liquid when tilted to and fro by the movement of said container, means for oscillating said container in a limited arc with a rocking motion sufficient to flow a portion of the liquid into the troughs at each oscillation but adapted to retain a substantial part of the liquid in said container and to flow back into said container the liquid caught in said troughs, and means for discharging ice from said container.

7. Ice making apparatus comprising an open-topped tray having bottom, side and end portions, means for refrigerating said tray, means rotatably mounting said tray for oscillation about an axis substantially parallel to said end portions whereby they may be alternately raised and lowered, said end portions each having an extension forming a collection receptacle positioned to receive overflow from the corresponding end of the tray when such end is tilted downwardly and to return such overflow to the same end of the tray when such end is tilted upwardly, and a plurality of partitions in such tray extending substantially parallel to said end portions whereby when the tray is oscillated water in the tray will flow from one portion to another over said partitions in said tray and a portion of such water will be received in said collection receptacles during each oscillation and will flow back into said tray over an end portion thereof.

8. Ice making apparatus comprising an open-topped ice receptacle having bottom, side and end portions, means for refrigerating said receptacle, means rotatably mounting said receptacle for oscillation about an axis substantially parallel to said end portions whereby they may be alternately raised and lowered, said end portions each having an extension forming a collection receptacle positioned to receive overflow from the corresponding end of the ice receptacle when such end is tilted downwardly and to return such overflow to the same end of the ice receptacle when such end is tilted upwardly, whereby when the ice receptacle is oscillated water in the ice receptacle will flow from one end portion to the other, and a portion of such water will be received in said collection receptacles during each oscillation and will flow back into said ice receptacle over an end portion thereof.

9. Ice making apparatus comprising an open-topped tray having bottom, side and end portions, means for refrigerating said tray, means rotatably mounting said tray for oscillation about an axis substantially parallel to said end portions whereby at least one of said end portions may be alternately raised and lowered, said end portion having an auxiliary receptacle positioned to receive overflow from the corresponding end of the tray when such end is tilted downwardly and to return such overflow to the same end of the tray when such end is tilted upwardly, and a plurality of partitions in such tray extending substantially parallel to said end portions whereby when the tray is oscillated water in the tray will flow from one portion to another over said partitions in said tray and a portion of such water will be received in said receptacles during each oscillation and will flow back into said tray over an end portion thereof.

10. In a machine as claimed in claim 6, partitions across said container parallel to the axis of oscillation thereof so as to divide the ice formed therein into a plurality of blocks, and means to modify the action of the oscillating means so as to cause such means to invert the container to discharge frozen blocks of ice therefrom by gravity.

11. An ice making machine comprising a rotatably mounted open-topped container for the liquid to be frozen, means for refrigerating said container, means for supplying liquid to said container, troughs on the ends of said container to catch excess liquid when tilted to and fro by the movement of said container, a rotatable driving member, a reciprocable rod connecting said driving member to said container and having a normal stroke limiting the motion of the container to an oscillation sufficient to flow a portion of the liquid into the troughs at each oscillation but adapted to retain a substantial part of the liquid in said container and to flow back into said container the liquid caught in said troughs, and means for shifting the line of stroke of said rod and thereby rotating the container to invert the same sufficiently to discharge ice downwardly by gravity therefrom.

12. In a machine as claimed in claim 6, partitions across said container parallel to the axis of oscillation thereof so as to divide the ice formed therein into a plurality of blocks, said oscillating means comprising a rotatable driving member, a reciprocable rod connecting said driving member to said container and having a normal stroke limiting the oscillation of the container to an arc of not over ninety degrees on each side of the horizontal center line of the container, and means for shifting the line of stroke of the rod and thereby rotating said container to invert the same sufficiently to discharge the frozen blocks of ice by gravity therefrom.

WILLIS B. KIRKPATRICK.

REFERENCES CITED

The following references are of record in the file of this patent:

UNITED STATES PATENTS

| Number | Name | Date |
|---|---|---|
| 354,065 | Komp | Dec. 7, 1886 |
| 435,566 | Meyer | Sept. 2, 1890 |
| 702,995 | Powell | June 4, 1902 |
| 1,144,312 | Wiemann | June 22, 1915 |
| 1,250,528 | Swanson | Dec. 18, 1917 |
| 2,025,711 | Bennis | Mar. 23, 1932 |
| 2,405,272 | Smith | Aug. 6, 1946 |
| 2,493,900 | Schaberg et al. | Jan. 10, 1950 |
| 2,526,262 | Munshower | Oct. 17, 1950 |